United States Patent [19]

Johnson et al.

[11] Patent Number: 4,996,249
[45] Date of Patent: Feb. 26, 1991

[54] METHOD TO IMPROVE FLOWABILITY OF RESIN COATED SAND

[75] Inventors: Calvin K. Johnson, Lockport; Richard C. Cooke, North Riverside; Kwok-Tuen Tse, Chicago, all of Ill.

[73] Assignee: Acme Resin Corporation, Westchester, Ill.

[21] Appl. No.: 344,132

[22] Filed: Apr. 27, 1989

[51] Int. Cl.$^5$ .................. C08K 5/524; C08K 5/41; C08K 5/06; C08L 61/06

[52] U.S. Cl. .................. 523/144; 523/145; 524/144; 524/156; 524/165; 524/376; 428/404

[58] Field of Search .................. 523/144, 145, 146; 428/404; 524/144, 156, 165, 376

[56] References Cited

U.S. PATENT DOCUMENTS 3,644,274  2/1972  Maurukas .................. 523/144
4,236,569  12/1980  Epstein et al. .................. 523/145
4,468,359  8/1984  Lemon et al. .................. 523/145
4,474,904  10/1984  Lemon et al. .................. 523/145
4,495,316  1/1985  Armbruster .................. 523/144

FOREIGN PATENT DOCUMENTS 53-130224  11/1978  Japan .
54-136524  10/1979  Japan .
582882  12/1977  U.S.S.R. .

Primary Examiner—Lewis T. Jacobs
Attorney, Agent, or Firm—Rockey and Rifkin

[57] ABSTRACT

A process for improving the flowability of resin coated sand which comprises the use of a fluorosurfactant with the mixture of sand and resin. Also provided is a resin binder containing a fluorosurfactant and a foundry mix comprising foundry sand, a resin binder and a fluorosurfactant. The resins used are alkaline phenolic resole resins and acid-curable resins.

34 Claims, No Drawings

METHOD TO IMPROVE FLOWABILITY OF RESIN COATED SAND

FIELD OF THE INVENTION

This invention relates to resin binders useful for making foundry sand cores and molds and to a method for improving the flowability of sands coated with the resins.

BACKGROUND OF THE INVENTION

Binders or binder systems for foundry cores and molds are well-known. In the foundry art, cores or molds for making metal castings are normally prepared from a mixture of an aggregate material, such as sand, and a binding amount of a binder or binder system. Typically, after the aggregate material and binder have been mixed, the resulting mixture is rammed, blown or otherwise formed to the desired shape or pattern, and then cured with the use of catalysts and/or heat to a solid, cured state.

A variety of different processes for forming molds and cores have been developed in the foundry industry One type of process known as the "hot-box" process requires that the mixture of aggregate material and binder be cured and hardened in a holding pattern or core box while subjected to heat. Another type of binder system which does not require heating in order to bring about curing or hardening is known as a "no-bake" process. A third type of process used for forming molds or cores is known as the "cold-box" process. "Cold-box" processes are generally carried out by passing gaseous catalysts or hardeners through molded resin-coated sand at ambient temperatures in order to achieve curing.

Resins cured with acids or acid salts have been used in both the hot box and no bake processes. Such acid cured resins include both phenolic and furan resins as well as mixtures of these with other resins. Akaline solutions of phenolic resole resins have been used as binders in both no bake and cold box processes. When such alkaline phenolic resole resins are used in the no bake process, they are cured by the addition of a liquid ester hardener. When the alkaline phenolic resole resin binders are used in the cold box process, they are cured by means of a gaseous or vaporized ester hardener.

Sands coated with alkaline phenolic resole and acid-curable resins tend to have less flowability than sands coated with certain other binder systems This can adversely affect quality of the foundry cores and molds. In the case of the cold box process, higher blow pressures are needed to blow the coated sand into the core boxes and it is more difficult to blow uniformly dense cores.

Now it has been found, in accordance with this invention, that the use of certain surfactants improves the flowability of sands coated with alkaline phenolic resole and acid-curable resin binders. These sands form cores and molds with smoother surfaces and sharper edges, as well as with more uniform density. Such cores and molds give castings of better quality. This improvement also makes possible the production of cores and molds with more delicate patterns. Furthermore, when the resin coated sands of this invention are blown into core boxes, they can be blown at lower pressures resulting in less pattern wear and in less sand being blown out of the vents. In addition, the cores prepared from these sands are released more readily from the core boxes.

SUMMARY OF THE INVENTION

In accordance with this invention, there is provided a process for improving the flowability of sand coated with a resin binder selected from the group consisting of alkaline phenolic resole resin binders and acid-curable resin binders. This comprises incorporating into the mixture of sand and resin binder fluorosurfactant in an amount from about 0.01 percent to about 5 percent by weight of the resin binder.

Further provided, in accordance with this invention, is a foundry mix for preparing foundry cores and molds which comprises a foundry sand, from about 0.5 percent to about 8 percent by weight of the sand of a resin binder selected from the group consisting of alkaline phenolic resole resin binders and acid-curable resin binders, and from about 0.01 percent to about 5 percent by weight of the phenolic resole resin of a fluorosurfactant.

Also provided, in accordance with this invention, is a binder for foundry cores and molds which comprises a resin binder selected from the group consisting of alkaline phenolic resole resin binders and acid-curable resin binders, and from about 0.01 percent to about 5 percent by weight of the resin binder of a fluorosurfactant.

DESCRIPTION OF THE PREFERRED EMBODIMENTS

The process of this invention may be employed with various resins used as binders for foundry sand cores and molds. These include the resins which are cured by acids or acid salts in hot box or no bake processes. The process of this invention is particularly useful with the alkaline phenolic resole resin binders which are cured by one or more esters such as methyl formate, triacetin, butyrolactone and the like.

Ester-cured alkaline phenolic resole resin binders may be used in either the no bake or cold box processes. When they are used in the no bake process, the resin and ester are first coated on the sand. The coated sand is then placed in a core or mold box, and the resin is allowed to cure at ambient temperature to give a solid core or mold. This process and useful esters are described in detail in U.S. Pat. No. 4,474,904 (U.S. Pat. No. Re. 32,812) which is incorporated herein by reference in its entirety.

When ester-cured alkaline phenolic resole resin binders are used in the cold box process, foundry sand is coated with the resin. The resin coated sand is blown into a core box. Then a gaseous or vaporized ester, such as methyl formate is passed through the coated sand to cure the resin. This process is described in detail in U.S. Pat. No. 4,468,359 (U.S. Pat. No. Re. 32,720) which is also incorporated herein by reference in its entirety.

The acid-cured resin binders which may be used with this invention include a wide range of products made from phenolic resole resins, urea formaldehyde resins, or furfuryl alcohol or its reaction products with formaldehdye or phenol or various mixtures of the above. Two commercial types of hot box resins are the phenolic and furan resins. The phenolic hot box resins are typically a mixture of phenolic resole and urea formaldehyde resin while the furan hot box resins are typically a mixture of furfuryl alcohol or its reaction products with formaldehyde and urea formaldehyde resin. Blends of these two types of hot box resins are also possible to yield phenolic-furan hot box resins.

Acid-curable no bake resins include a wide range of products made from phenol, urea, formaldehyde and furfuryl alcohol. Some no bake resins do not contain urea. These types include the phenolic resole no bake binders and the furan no bake binders or blends of phenolic or furan resins. Many phenolic or furan no bake resins also contain urea formaldehyde resin.

The acid cured hot box resins typically are cured with acid salt catalysts. Ammonium nitrate and ammonium chloride are often used for this purpose. Acid cured no bake resins are cured with acids such as toluene sulfonic acid, benzene sulfonic acid or phosphoric acid.

Any refractory material commonly used to make foundry cores and molds can be used in the composition and process of this invention. Such refractory material includes silica sands, lake sands, bank sands, zircon sands, chromite sand, olivine sand and the like. Also, mixtures of these materials may be used.

The resin binders used in the processes can be employed in the proportions normally used in foundry binder operations. Normally these are between about 0.5 parts and about 8 parts by weight of the resin binder per 100 parts of the refractory material.

In the practice of this invention, a fluorosurfactant in an amount from about 0.01 percent to about 5 percent, preferably from about 0.1 percent to about 2 percent by weight of the resin binder is used. This fluorosurfactant may be mixed with the resin before it is coated on the sand. Alternatively, the fluorosurfactant may be added separately before, during or after the coating of the sand with the resin.

The fluorosurfactant used in the practice of this invention may be anionic, nonionic, cationic or amphoteric. These fluorosurfactants contain one or more fluorocarbon hydrophobic groups attached to an ionic or nonionic hydrophilic group. Suitable fluorosurfactants are those available from the DuPont Company under the trade name Zony ® and the surfactants available from the 3M Corporation having the Fluorad trademark.

It is often the practice in the foundry art to include a variety of additives in the resins used to prepare foundry cores and molds. These additives include such materials as silanes, deodorizing agents, urea, and the like. Such additives may be used in the present process and do not interfere with the improved flowability of the resin coated sands.

The following examples illustrate the invention. It is to be understood that the examples are illustrative only and do not intend to limit the invention in any way. In the examples, all parts and percentages are by weight, unless otherwise indicated.

EXAMPLE I

WEDRON 530 sand was coated with a mixture of an alkaline phenolic resin and a fluorosurfactant. The amount of resin used was 1.75 percent by weight of the sand and the amount of fluorosurfactant used was about 3 percent by weight of the phenolic resole resin. The alkaline phenolic resole resin used was a commercial resin, BETASET 9511, available from the Acme Resin Corporation, Westchester, Ill. Four different fluorosurfactants were used. These were anionic surfactant FC-109, cationic surfactant FC-135, and nonionic surfactants FC-171 and FC-430. All of these surfactants are available from the 3M Company, St. Paul, Minn. under the trade name Fluorad. A comparative test was made using sand coated with the resin without the addition of any fluorosurfactant.

Flowability of the resin coated sands was measured three minutes after resin was added to the sand by the moldability test given in the AFS Mold and Core Test Handbook. In this procedure, 300 g of the resin coated sand was placed in a Dietert lab moldability and work life tester equipped with an eight-mesh cylindrical screen. The sand mix was riddled through the screen for ten seconds. Moldability index was calculated as the percentage of sand which passed through the screen. Results of the test given in Table I show that the sand coated with resin containing the fluorosurfactant had a much higher moldability index and consequently much greater flowability than sand coated with the resin only.

TABLE I

| Moldability of Sand Coated with BETASET 9511 and Fluorosurfactants | |
|---|---|
| Fluorosurfactants | Moldability Index |
| None (Comparative Test) | 71.5 |
| FC-109 (3.3%) | 92.2 |
| FC-135 (3.0%) | 92.6 |
| FC-171 (3.1%) | 88.0 |
| FC-430 (3.1%) | 78.3 |

EXAMPLE II

The general procedure of Example I was followed except that varying amounts of the fluorosurfactants FC-109 and FC-135 were added to the sand. The results given in Table II show that sand coated with the phenolic resin containing reduced amounts of fluorosurfactant still showed much improved flowability over the comparative test which contained no fluorosurfactant.

TABLE II

| Moldability of Sand Coated With BETASET 9511 and Fluorosurfactants | | |
|---|---|---|
| | Moldability Index | |
| % Fluorosurfactant | FC-109 | FC-135 |
| 0 (Comparative Test) | 71.5 | 71.5 |
| 0.5 | 83.0 | — |
| 0.75 | 84.9 | 88.8 |
| 1.0 | 86.6 | — |
| 1.5 | 87.3 | 92.0 |
| 3.0 | — | 92.6 |
| 3.3 | 92.2 | — |

Sands coated with the BETASET 9511 resin containing 1 percent fluorosurfactant FC-109 were tested making standard AFS (dog bone) tensile cores. Test cores were prepared by blowing the mixture at 80 pounds per square inch air pressure into a Redford Laboratory three cavity cold box machine. The cores were cured by gassing with a 70:30 mixture of methyl formate and air for seven seconds. The core box was opened after ten seconds and the cores were removed. Release characteristics of the cured cores was noted. A series of cores was prepared without cleaning the core box. The same procedure was followed using sand coated with the resole resin BETASET 9511 to which no fluorosurfactant had been added. It was increasingly more difficult to remove each subsequent set of cores when no surfactant was present. However, when the surfactant was present, subsequent sets of cores were released more readily from the core box. This improved release of cores is an additional advantage observed when the process of this invention is followed.

EXAMPLE III

The general procedure of Example I was followed except that the phenolic resole resin employed was AlpHASET 9010 resin, available from the Acme Resin Corporation, Westchester, Ill. Sand was coated using 1.5 percent by weight of the resin and 0.38 percent by weight of the ester hardener, triacetin. The resin contained 1 percent of one of the following fluorosurfactants available from E. I. DuPont de Nemours Co., Wilmington, Del.: the anionic surfactant FSA, the cationic surfactant FSC, the amphoteric surfactant FSK, and the nonionic surfactant FSN. The results of the moldability tests are given in Table III. They demonstrate that these fluorosurfactants all improve the flowability of sand coated with the ester curable alkaline phenolic resole resin.

TABLE III

Moldability of Sand Coated with ALpHASET 9010 and Fluorosurfactants

| Fluorosurfactant | Moldability Index |
|---|---|
| FSA | 94.6 |
| FSC | 91.6 |
| FSK | 93.9 |
| FSN | 91.4 |
| None (comparative test) | 84.1 |

EXAMPLE IV

The general procedure of Example I was followed except that the resin coated on the sand was either a hot box resin or an acid-cured no bake resin. The hot box resin employed was Resin 745 PL, a phenolic resole resin also containing urea-formaldehyde, available from the Acme Resin Corporation, Westchester, Ill. Sand was first coated with 0.45 percent by weight of the acid salt catalyst 45 MRIBS available from the Acme Resin Corporation, Westchester, Ill. The mixture was stirred for one minute and then 1.5% by weight of resin was added and the mixture was stirred for another minute. The resin contained 1 percent by weight of a fluorosurfactant. The resin coated sand was then tested for flowability using the moldability index test.

A phenolic no bake Resin 975 available from the Acme Resin Corporation, Westchester, Ill. containing 1 percent by weight of various fluorosurfactants was tested in a similar manner. In this case, 0.4% by weight of the acidic catalyst 91D (Acme Resin Corporation) was first coated on the sand and then the resin containing the fluorosurfactant was added to the sand.

A number of different fluorosurfactants available from the DuPont Company and the 3M Company were employed in these tests. Results of the tests given in Table IV show that many fluorosurfactants are suitable for use in the process of this invention.

TABLE IV

Moldability of Sand Coated With Hot Box and No Bake Resins and Fluorosurfactants

| Fluorosurfactants | Moldability Index Hot Box Resin | No Bake Resin |
|---|---|---|
| ANIONICS | | |
| DuPont FSJ | 69.1 | (a) |
| DuPont FSA | 76.1 | 70.3 |
| DuPont FSE | 67.9 | 58.3 |
| DuPont FSP | 67.0 | 68.0 |
| DuPont TBS | 61.4 | 63.0 |
| 3M FC-109 | 71.1 | 71.7 |
| 3M FC-120 | 75.2 | 69.0 |
| CATIONIC | | |
| DuPont FSC | 78.4 | 73.5 |
| 3M FC-135 | 76.3 | 88.3 |
| AMPHOTERIC | | |
| DuPont FSK | 70.3 | 75.7 |
| NONIONIC | | |
| DuPont FSN | 61.8 | 69.3 |
| DuPont FSO | 74.9 | 70.7 |
| 3M FC-170C | 73.3 | 74.6 |
| 3M FC-171 | 69.6 | 78.6 |
| 3M FC-430 | 75.5 | 64.7 |
| 3M FC-431 | 68.9 | 63.0 |
| COMPARATIVE TEST | | |
| None | 59.4 | 54.4 |

(a) Resin and surfactant were incompatible

EXAMPLE V

The general procedure of Example IV was followed except that the resin coated on the sand was a furan no bake resin. The resin employed was Furan No Bake Resin 935, available from the Acme Resin corporation, Westchester, Ill. Sand was first coated with 0.45 percent by weight of the acid catalyst 94A, also available from the Acme Resin Corporation. Then, 1.5 percent by weight of resin containing 1 percent of a fluorosurfactant was added. The fluorosurfactants used were the DuPont fluorosurfactants used in Example III. Results of the tests given in Table V show that fluorosurfactants improve the flowability of sand coated with an acid curable no bake furan resin.

TABLE V

| Moldability of Sand Coated With a Furan No Bake Resin | |
|---|---|
| Fluorosurfactants | Moldability Index |
| FSA | 61.6 |
| FSC | 63.1 |
| FSK | 64.1 |
| None (Comparative test) | 59.2 |

Thus, it is apparent that there has been provided, in accordance with this invention, a method for improving the flowability of resin coated sand that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to include all such alternatives, modifications and variations as set forth within the spirit and broad scope of the appended claims.

What is claimed is:

1. A process for improving the flowability of sand coated with a resin binder selected from the group consisting of alkaline phenolic resole resin binders and acid-curable resin binders which comprises incorporating in the mixture of sand and resin binder fluorosurfactant in an amount from about 0.01 percent to about 5 percent by weight of the resin binder 2. The process of claim 1 wherein the fluorosurfactant is added to the resin binder before it is coated on the sand.

3. The process of claim 1 wherein the resin binder is an aqueous alkaline solution of an ester-curable phenolic resole resin.

4. The process of claim 3 wherein the phenolic resole resin further comprises an ester.

5. The process of claim 4 wherein the ester comprises triacetin.

6. The process of claim 1 wherein the resin binder is an acid-curable no bake foundry resin.

7. The process of claim 6 wherein the acid-curable no bake foundry resin comprises a phenolic resin.

8. The process of claim 6 wherein the acid-curable no bake foundry resin comprises a furan resin.

9. The process of claim 6 wherein the sand is also coated with an acid catalyst.

10. The process of claim 1 wherein the resin binder is an acid-curable hot box foundry resin.

11. The process of claim 10 wherein the acid-curable hot box resin comprises a phenolic resin.

12. The process of claim 1 wherein the amount of fluorosurfactant is from about 0.1 percent to about 2 percent by weight of the resin binder.

13. A foundry mix for preparing foundry cores and molds which comprises a foundry sand, from about 0.5 percent to about 8 percent by weight of the sand of a resin binder selected from the group consisting of alkaline phenolic resole resin binders and acid-curable resin binders and from about 0.01 percent to about 5 percent by weight of the resin binder of a fluorosurfactant.

14. The foundry mix of claim 13 wherein the resin binder is an aqueous alkaline solution of an ester-curable phenolic resole resin.

15. The foundry mix of claim 14 wherein the phenolic resole resin further comprises an ester.

16. The foundry mix of claim 15 wherein the ester comprises triacetin.

17. The foundry mix of claim 13 wherein the resin binder is an acid-curable no bake foundry resin.

18. The foundry mix of claim 17 wherein the acid-curable no bake foundry resin comprises a phenolic resin.

19. The foundry mix of claim 17 wherein the acid-curable no bake foundry resin comprises a furan resin.

20. The foundry mix of claim 17 wherein the sand is also coated with an acid catalyst.

21. The foundry mix of claim 13 wherein the resin binder is an acid-curable hot box foundry resin.

22. The foundry mix of claim 21 wherein the acid-curable hot box resin comprises a phenolic resin.

23. The foundry mix of claim 13 wherein the amount of fluorosurfactant is from about 0.1 percent to about 2 percent by weight of the phenolic resole resin.

24. A binder for foundry cores and molds which comprises a resin binder selected from the group consisting of alkaline phenolic resole resin binders and acid-curable resin binders and from about 0.01 percent to about 5 percent by weight of the resin binder of a fluorosurfactant.

25. The binder of claim 24 wherein the resin binder is an aqueous alkaline solution of an ester-curable phenolic resole resin.

26. The binder of claim 25 wherein the phenolic resole resin further comprises an ester.

27. The binder of claim 26 wherein the ester comprises triacetin.

28. The binder of claim 24 wherein the phenolic resole resin binder is an acid-curable no bake foundry resin.

29. The binder of claim 28 wherein the acid-curable no bake foundry resin comprises a phenolic resin.

30. The binder of claim 28 wherein the acid-curable no bake foundry resin comprises a furan resin.

31. The binder of claim 28 wherein the sand is also coated with an acid catalyst.

32. The binder of claim 24 wherein the resin binder is an acid-curable hot box foundry resin.

33. The binder of claim 32 wherein the acid-curable hot box resin comprises a phenolic resin.

34. The binder of claim 24 wherein the fluorosurfactant comprises from about 0.1 percent to about 2 percent by weight of the binder.

* * * * *